United States Patent [19]

Bridges

[11] Patent Number: 5,055,675
[45] Date of Patent: Oct. 8, 1991

[54] PULSE HEIGHT ANALYZER FOR SPECTROSCOPY THERMAL MULTIGATE DECAY WELL LOGGING SYSTEM

[75] Inventor: James R. Bridges, Houston, Tex.

[73] Assignee: Halliburton Logging Services, Inc., Houston, Tex.

[21] Appl. No.: 535,614

[22] Filed: Jun. 8, 1990

Related U.S. Application Data

[63] Continuation of Ser. No. 213,752, Jun. 13, 1988, abandoned.

[51] Int. Cl.$^5$ .......................... G01V 5/04; G01V 5/08
[52] U.S. Cl. .................................... 250/262; 250/256; 250/261; 250/264; 364/422
[58] Field of Search ............... 250/256, 259, 261, 262, 250/264, 263, 265; 364/422; 307/542

[56] References Cited

U.S. PATENT DOCUMENTS

| | | |
|---|---|---|
| 3,959,648 | 5/1976 | Pitts, Jr. et al. ..................... 250/262 |
| 4,042,824 | 8/1977 | Pitts, Jr. et al. ..................... 250/263 |
| 4,302,669 | 11/1981 | Allen et al. ......................... 250/264 |
| 4,471,435 | 9/1984 | Meisner ............................. 364/422 |
| 4,707,741 | 11/1987 | Stratton ............................. 307/542 |
| 4,788,424 | 11/1988 | Preeg ................................ 250/262 |

Primary Examiner—Constantine Hannaher
Assistant Examiner—Jacob M. Eisenberg
Attorney, Agent, or Firm—William J. Beard

[57] ABSTRACT

A pulse height analyzer for spectrocopy thermal multigate decay well logging systems is disclosed and has an input section comprising a peak time determining circuit locating a peak occurrence. The peak is determined relative to a threshold voltage determining circuit. On peak detection, a timing signal is formed for a control circuit. This operates a sample and hold switch at the output of an amplifier for the input. This switch inputs to an A/D converter driving a buffer. Various handshake signals cooperate with a telemetry system to transfer the peak time A/D valve for pulse height measurement.

22 Claims, 2 Drawing Sheets

PULSE HEIGHT ANALYZER FOR SPECTROSCOPY THERMAL MULTIGATE DECAY WELL LOGGING SYSTEM

This is a continuation of application Ser. No. 07/213,752 filed June 13, 1988, now abandoned.

BACKGROUND OF THE DISCLOSURE

The present disclosure is directed to an pulse height conversion or analog-to-digital circuit and particularly one useful in digitizing pulse height signals scattered over a wide energy range resulting from pulse neutron irradiation of formations adjacent to a cased well. A logging sonde having a pulsed neutron source is lowered on a cable into a well to provide periodic bursts of neutrons into the immediate formations. The response of the formations is measured by observation of a scintillation counter or photomultiplier tube (PMT). The formation response has the form of a number of close nuclear events of irregular spacing, but typically is an avalanche of pulses where pulse energy level varies over a relatively wide range. This provides an output signal from a typical PMT which is a plurality of pulses of variant height. The pulses occur so rapidly that it is difficult to obtain a count of the pulses as well as pulse height measurements. This measurement must be accomplished in a logging tool which is lowered in downhole circumstances, exposed to extremely high temperatures and subjected to shock loading as the sonde is retrieved from the well. The present apparatus is a pulse height measuring system which digitizes the variable energy nuclear events, provides a digitized measure thereof, and which operates at sufficient speed that the consequential burst of nuclear events can be measured.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawing.

It is to be noted, however, that the appended drawing illustrates only typical embodiments of this invention and are therefore not to be considered limiting of its scope, for the invention may admit to other equally effective embodiments.

Figure 1A:
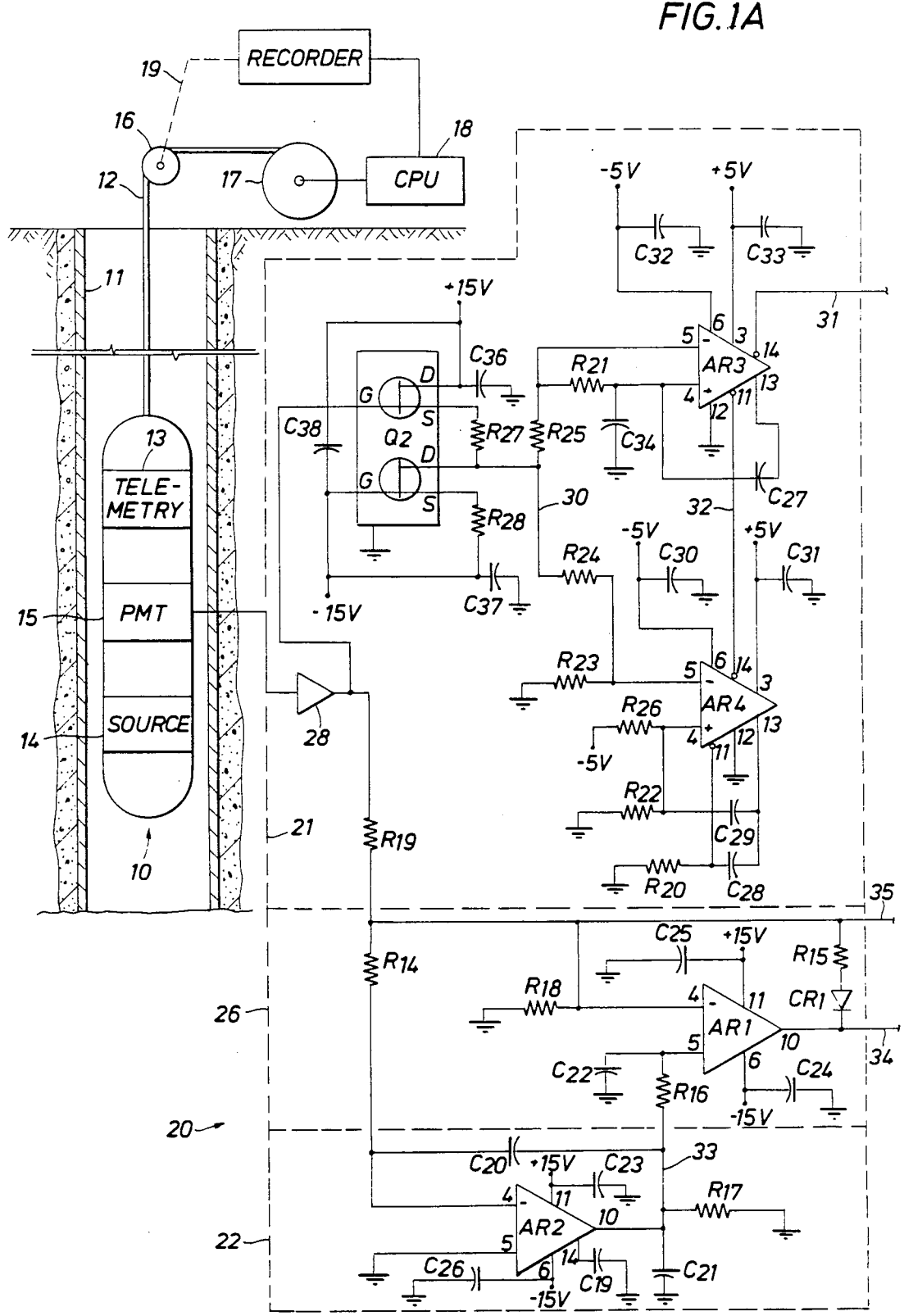
Figure 1B:
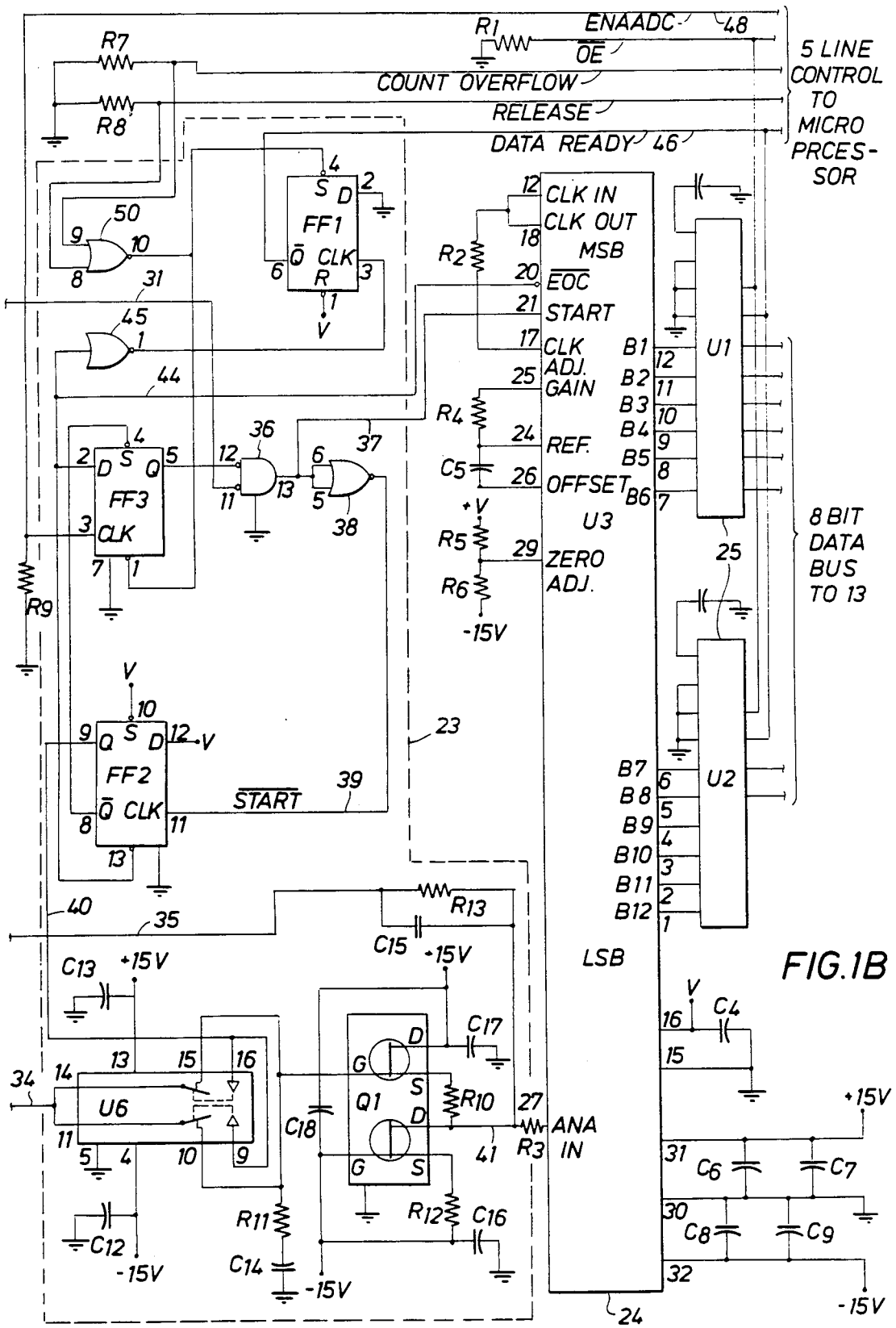

The only view is a schematic wiring diagram of the circuit of the present invention installed in a sonde.

DETAILED DESCRIPTION OF THE PREFERRED EMBODIMENT

In the single drawing, the numeral 10 identifies a sonde which is lowered into a cased well 11 supported on a logging cable 12. The sonde encloses a telemetry system 13 to transmit data to the surface; as needed, the cable transmits instructions for operation of the sonde. A pulsed neutron source 14 is likewise included in the sonde. A PMT 15 located in the sonde responds after the burst of neutrons which irradiate the adjacent formations. On irradiation, an avalanche of nuclear events is observed in the PMT which provides an output signal for handling by the present circuit. There may be more than one PMT in the sonde, and in that instance, duplicate sets of equipment can be provided. The logging cable 12 passes over a sheave 16 and is stored on a drum 17. The logging cable provides signals on insulated conductors in the cable to a CPU 18. The CPU forms signals which are recorded on a recorder as a function of depth. The recorder is connected by suitable mechanical or electrical measuring means 19 to sheave 16 so that the data from the CPU 18 is recorded as a function of depth in the well 11.

The numeral 20 identifies the circuit of the present disclosure. It is comprised of several major segments. The first major segment is located within the dotted line 21 and is described as a voltage pulse peak detector. It cooperates with other components, namely a voltage pulse amplifier 26, a base line restoring circuit 22, a peak sample and hold circuit 23, an A/D converter 24 and an output buffer register 25 shown as two circuit components.

The output of the PMT 15 is supplied through a typical pre-amp 28 and then is input to a MOSFET high impedance input circuit Q2. As will be observed, the input signal is applied to the gate of a first MOSFET forming an output across a voltage follower and thus has unity gain. The circuit incorporating Q2, R27, R28, C36, C37 and C38 forms an output on a conductor 30. This output signal is applied to a pair of circuits at AR3 and AR4, a peak detector and threshold voltage discriminator respectively. The circuit AR4 which incorporates additional components R20, R22, R23, R24, R26, C28, C29, C30 and C31 sets a threshold above which signals are detected. Pulses which do not rise to this threshold are ignored by the system. Thus, the output of the amplifier AR4 enables the peak detector AR3 to recognize only pulses of a certain amplitude or greater. The signal on the conductor 30 is input to pins 4 and 5 of the amplifier AR3. The circuit AR3 includes components C27, C32, C33, C34, R21 and R25. Components R21 and C34 operate as an integrator circuit. So long as the input voltage on the conductor is rising, the input at pin 5 increases more rapidly than the input at pin 4. When the voltage peaks and begins to decrease, this provides a voltage reversal at the pins 4 and 5. Assuming that the amplifier AR3 has been enabled by the voltage threshold discriminator AR4, the output of AR3 at pin 14 goes from high to low on conductor 31 to provide a switching signal which causes the sample and hold circuit 23 to switch from sampling to hold and also starts the analog-to-digital conversion occurring in the circuit 24. A conductor 32 provides the enable signal for the amplifier AR3.

The pulse amplifier AR1 incorporates components C22, C24, C25, R14, R15, R16, R18, R19, R13, C15 and CR1. This circuit is an amplifier providing an inverted output. The differential signal formed between the input at pins 4 and 5 is controlled by the output of the base restorer circuit supplied over the conductor 33 from the amplifier AR2. The output pulse is sharpened by the diode CR1 and R15 which function as a clamp at about 0.6 volts below ground when the output is unloaded and free to drift by the switching circuit to be described. The conductor 33 provides the restored baseline value for AR1 from AR2. The baseline restorer includes the amplifier AR2 and also C19, C20, C21, C23, C26 and R17. This system is an inverting voltage integrating circuit which responds to the average DC level at the input pin 4 and forms a correction voltage for the conductor 33. The feedback loop around AR2 incorporates the capacitor C20 to establish the reference or baseline value. The output of the amplifier AR1 is supplied on the conductor 34 for a switching circuit to be described.

The conductor 35 delivers the amplified analog value from Q1 to pin 4 of AR1 as a feedback signal for AR1 for its operation.

DESCRIPTION OF THE PEAK SAMPLE AND HOLD CIRCUIT 23

Operation of this circuit revolves around operation of the analog voltage switch U6, the voltage hold capacitor C14 connected to the output of that switch, a voltage buffer including the dual MOSFET unity gain buffer Q1, and control established by the flip flops FF1, FF2, FF3 and the several gates to be described. Operation of the circuit 23 involves the following actions. Assume that the peak detector circuit 21 senses a signal above the preset level. In that event, pin 14 of AR3 goes low to form a signal on the conductor 31 applied to an AND gate 36. Assume that the Q output of FF3 is low so that the AND gate 36 is enabled, forming a high output. This provides a start signal on the conductor 37 to the A/D 24. This starts analog-to-digital conversion. The signal on the conductor 31 remains low for a short period, and it ultimately reverts to a high level. When this occurs, the signal is coupled through the AND gate 36 and an inverter gate 38. Output goes high on the conductor 39. The signal on the conductor 39 is a clock pulse for FF2 which is a control flip flop providing a control signal for the switch U6. The FF2 output is on the conductor 40 and is denoted as the HS signal for the hold sample indication. The HS signal goes high, thereby opening the analog switch U6. In turn, the sample peak voltage is held constant at the analog switch hold capacitor C14. The voltage on that capacitor is supplied to pin 27 on the conductor 41 through the voltage buffer Q1. Q1 is a buffer amplifier with a gain of one. The input voltage applied to the input of Q1 is seen on conductor 41 and input to the A/D converter 24. The switch U6 selects the voltage on the hold capacitor C14 when U6 is open or the AR1 output when U6 is closed. It should be understood that subsequently occurring spectrum pulses should not be permitted to restart the analog-to-digital conversion. This is accomplished by utilizing the $\bar{Q}$ output from pin 8 of FF2 applied to the set terminal of FF3, altering the Q output of FF3 at pin 5 which disables the AND gate 36. This interlock coupled through the start conductor 39 holds until the analog conversion has been completed.

When the conversion has been finished, the A/D 24 provides an output on pin 20 which goes low to form an end of conversion (EOC) signal on the conductor 44. This resets FF2 and FF3, converting the HS signal to a low signal and in turn closes the analog voltage switch U6. The EOC signal provides a positive going or high signal through the inverter gate 45 providing a clock pulse for FF1. The FF1 is thus operated and forms a high signal on the $\bar{Q}$, the high signal being provided on a conductor 46 which indicates that data is ready. This is input to the buffers 25 to cause such register buffers 25 to latch the values in the buffers. This signal is used in the system to initiate a handshake, with a downhole telemetry microprocessor asserting that data is available through the 8 bit digital output from the two buffers 25 to the telemetry microprocessor system. When the handshake has been completed after initiation by the signal on the conductor 46 indicating data is ready, a return signal is received from the telemetry microprocessor on the conductor 48 which is the end of the transfer or the termination of the handshake from the telemetry microprocessor. This is input on the conductor 48. It is provided to terminal 3 of FF3 which breaks the routine just described. This indicates that the next peak can be prepared for measurement.

The A/D 24 provides multiple bit digitation to the output buffers 25 which in turn provide the 8 bits of data digital output for the telemetry microprocessor. Additional signals are provided from the telemetry system microprocessor. One is a release signal and another output from the telemetry microprocessor circuit is a count overflow signal. These are both input to an OR gate 50. While these may not occur often, should they occur, the gate 50 provides an input to the FF1 which interrupts operation until the two signals are removed.

Another input from the telemetry microprocessor is OE−, an enable signal for the buffers 25 to operate.

While the foregoing is directed to the preferred embodiment, the scope is determined by the claims which follow.

What is claimed is:

1. In a downhole logging tool in a sonde for making measurements of nuclear events occasioned by logging formations adjacent the well borehole wherein the nuclear events have variable frequency and amplitude and such nuclear events are measured by a measuring means which forms a measured signal, data conversion circuit which comprises:
   (a) an input circuit for receiving the measured signal which represents the nuclear events, said input circuit including:
      (1) threshold voltage determining means selecting a threshold voltage for the measured signal below which value the input circuit forms no response;
      (2) peak time determining means responsive to dynamic reversal and subsequent reduction in the measured signal from a larger value to a smaller value, said peak time determining means forming a peak occurrence timing signal indicative of such dynamic reversal above the threshold value by said threshold value determining means;
   (b) amplifier means connected to the measured signal for forming an amplified output signal;
   (c) base line restoring circuit means connected to said amplifier means for obtaining a regulated baseline value above which amplification by said amplifier means occurs;
   (d) an A/D converter having an analog input connected to said amplifier means for receiving the amplified signal therefrom;
   (e) output buffer register means connected to said A/D converter for providing a multi-bit representation of the measured signal through said amplifier means; and
   (f) control means responsive to said peak occurrence timing signal for forming a control signal supplied to said A/D converter to initiate operation thereof wherein operation continues to thereby provide conversion and outputting of digital representation to said buffer means, and further wherein said A/D converter forms an end of conversion signal output therefrom to said control means to enable said control means to initiate the next conversion.

2. In a downhole logging tool in a sonde for making measurements of nuclear events occasioned by logging formations adjacent the well borehole wherein the nuclear events have variable frequency, amplitude and spacing therebetween and such nuclear events are measured by a measuring means which forms a measured signal, data conversion circuit which comprises:

(a) input circuit means for receiving the input measured signal which represents the nuclear events, said input circuit means including:
  (1) threshold voltage determining means selecting a threshold voltage for the measured signal below which value the input circuit forms no response;
  (2) peak time determining means responsive to dynamic input signal reversal and subsequent reduction in the input signal from a larger value to a smaller value, said peak time determining means dynamically forming a peak occurrence timing signal indicative of such reversal above the threshold value of said threshold value determining means;
(b) amplifier means connected to the input signal for forming an amplified output signal;
(c) base line restoring circuit means connected to said amplifier means for forming a regulated baseline value above which baseline amplification by said amplifier means occurs;
(d) an A/D converter having an analog input connected to said amplifier means for receiving the amplified signal therefrom for conversion;
(e) output buffer register means connected to said A/D converter for holding a multi-bit representation of the measured signal amplifier by and output from said amplifier means;
(f) control means responsive to said peak occurrence timing signal for forming a control signal supplied to said A/D converter thereof wherein operation continues to thereby complete conversion and outputting of digital representation to said buffer means, and further wherein said A/D converter forms an end of conversion signal output therefrom to said control means to enable said control means to initiate the next conversion; and
(g) output control signal means extending from said control means and adapted to be connected with a sonde located multi-bit telemetry means to enable said control means to cooperate with a telemetry means for timed transfer of the multi-bit representation.

3. The apparatus of claim 2 wherein said sonde is supported on said logging cable spooled over a sheave at the surface and said sheave is connected to a measuring means to locate said sonde in the well so that the nuclear events from the well formations are correlated to well depth.

4. The apparatus of claim 3 incorporating a source in sonde initiating the nuclear events on a periodic controlled basis.

5. The apparatus of claim 4 including an enabling clamp means connected to the output of said amplifier means and to the input of said A/D converter and having an enabled input preventing clamping of an input analog signal to said A/D converter.

6. The apparatus of claim 2 including an input unity gain buffer amplifier connected to said input circuit having a high input impedance for providing isolation to the measured voltage source.

7. The apparatus of claim 2 wherein said control means includes means responsive to said peak current timing signal forming a latching signal holding said control means in the operated condition until receipt of an end of conversion signal from said A/D converter.

8. The apparatus of claim 2 including a sample and hold switch driving said buffer amplifier with (1) said amplified output signal; or (2) a nonvariant hold signal wherein said switch is switched to hold by said control means.

9. The apparatus of claim 8 including a hold capacitor connected to the output of said switch for providing a variable voltage responding to variations in said amplified output signal until said switch operates to a hold signal for a hold interval determined by said control means.

10. The apparatus of claim 9 including clamping means connected to the output of said amplifier means to limit amplified output to a specified voltage level.

11. The apparatus of claim 10 wherein said sonde is supported on said logging cable spooled over a sheave at the surface and said sheave is connected to a measuring means to locate said sonde in the well so that the nuclear events from the well formations are correlated to well depth.

12. The apparatus of claim 11 including a pulsed neutron source in said sonde to initiate the nuclear events and a photomultiplier tube in said sonde for measuring nuclear events.

13. In a downhole logging tool in a sonde for making measurements of nuclear events occasioned by logging formations adjacent the well borehole wherein the nuclear events have variable frequency, amplitude and spacing therebetween and such nuclear events are measured by a measuring means which forms a measured signal, a single channel data conversion circuit which comprises:

(a) input circuit means for receiving a single channel measured signal which input represents the nuclear events, said input circuit means including:
  (1) threshold voltage determining means selecting a threshold voltage for the input signal below which value the input circuit forms no response;
  (2) peak time determining means responsive to dynamic input signal reversal and subsequent reduction in the input signal from a larger value to a smaller value, said peak time determining means dynamically forming a peak occurrence timing signal indicative of such reversal above the threshold value of said threshold value determining means;
(b) amplifier means connected to the input signal for forming an amplified output signal;
(c) base line restoring circuit means connected to said amplifier means for obtaining a regulated baseline value above which baseline amplification by said amplifier means occurs;
(d) an A/D converter having an analog input connected to said amplifier means for receiving the amplified signal therefrom for conversion;
(e) output buffer register means connected to said A/D converter for holding a multi-bit representation of the measured signal amplified by and output from said amplifier means;
(f) control means responsive to said peak occurrence timing signal for forming a control signal supplied to said A/D converter thereof wherein operation continues to thereby complete conversion and outputting of digital representation to said buffer means, and further wherein said A/D converter forms an end of conversion signal output therefrom to said control means to enable said control means to initiate the next conversion; and (g) means for forming an output handshake signal for a sonde located telemetry system to prompt said telemetry system for data transmission along the logging cable supporting said sonde in a well borehole.

14. The apparatus of claim 13 wherein said sonde is supported on said logging cable spooled over a sheave at the surface and said sheave is connected to a measuring means to locate said sonde in the well so that the nuclear events from the well formations are correlated to well depth, and further including a source in sonde initiating the nuclear events on a periodic controlled basis.

15. The apparatus of claim 13 including an enabling clamp means connected to the output of said amplifier means and to the input of said A/D converter and having an enabled input preventing clamping of an input analog signal to said A/D converter.

16. The apparatus of claim 13 including an input unity gain buffer amplifier connected to said input circuit having a high input impedance for providing isolation to the measured voltage source.

17. The apparatus of claim 13 wherein said control means includes means responsive to said peak current timing signal forming a latching signal holding said control means in the operated condition until receipt of an end of conversion signal from said A/D converter.

18. The apparatus of claim 13 including a sample and hold switch driving said buffer amplifier with (1) said amplified output signal; or (2) a nonvariant hold signal wherein said switch is switched to hold by said control means.

19. The apparatus of claim 18 including a hold capacitor connected to the output of said switch for providing a variable voltage responding to variations in said amplified output signal until said switch operates to a hold signal for a hold interval determined by said control means.

20. The apparatus of claim 19 including clamping means connected to the output of said amplifier means to limit amplified output to a specified voltage level.

21. The apparatus of claim 20 wherein said sonde is supported on said logging cable spooled over a sheave at the surface and said sheave is connected to a measuring means to locate said sonde in the well so that the nuclear events from the well formations are correlated to well depth.

22. The apparatus of claim 21 including a pulsed neutron source in said sonde to initiate the nuclear events and also including a photomultiplier tube in said sonde for measuring nuclear events.

* * * * *